United States Patent Office 3,408,805
Patented Nov. 5, 1968

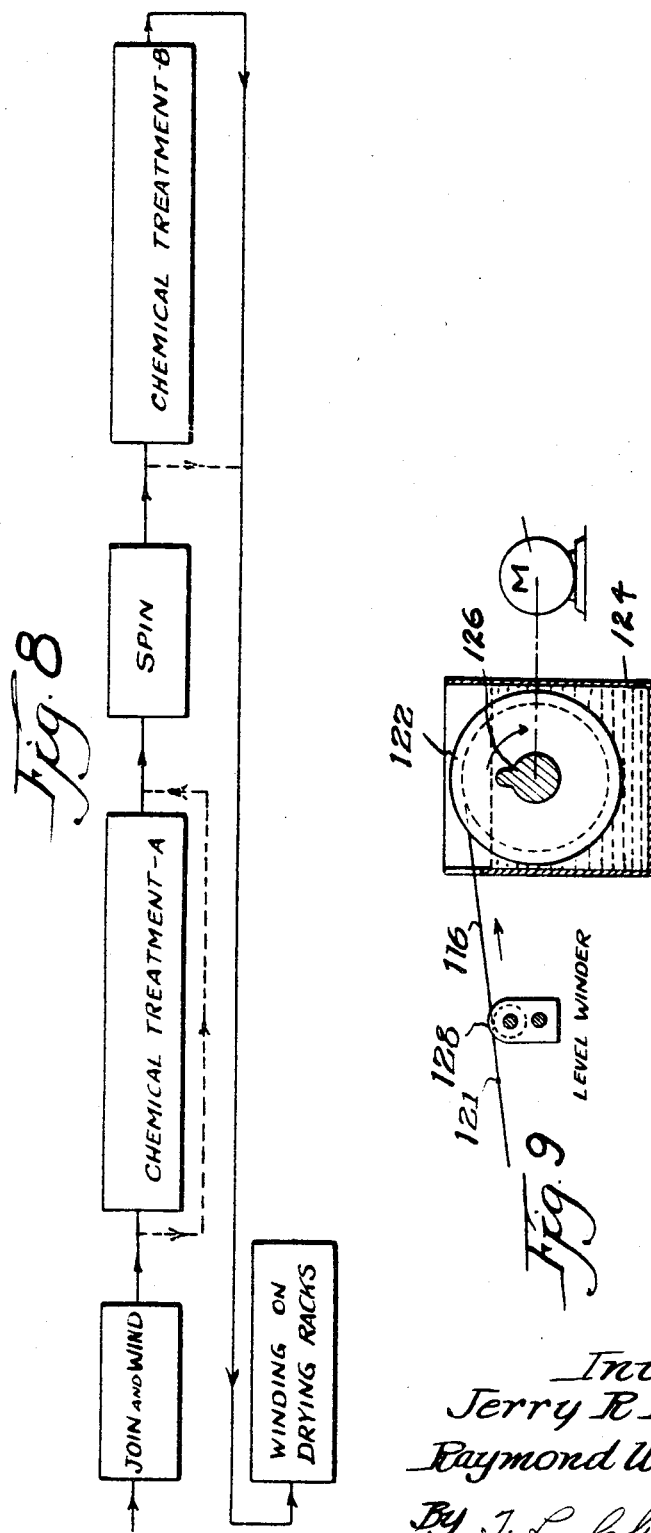

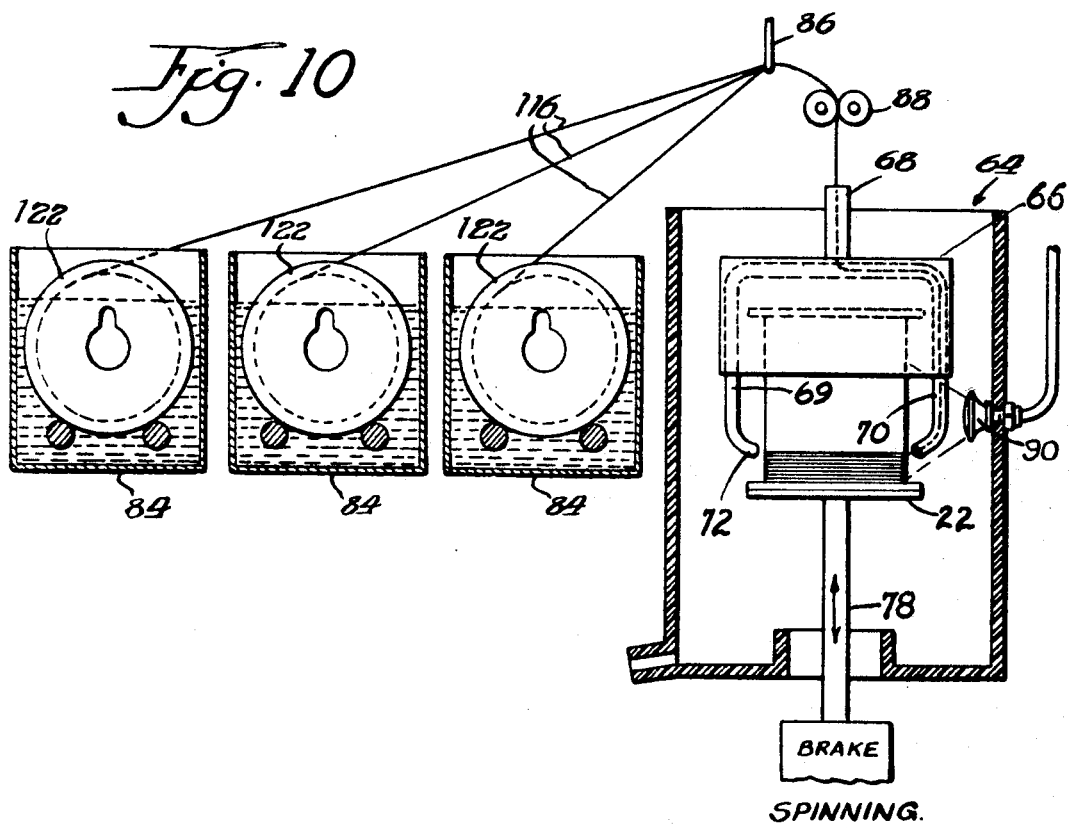

3,408,805
PROCESS AND APPARATUS FOR THE
MANUFACTURE OF SUTURES
Jerry R. Reeder, Lockport, and Raymond W. Bergman, Joliet, Ill., assignors to Ethicon Inc., a corporation of New Jersey
Filed Aug. 30, 1965, Ser. No. 483,446
22 Claims. (Cl. 57—35)

ABSTRACT OF THE DISCLOSURE

Continuous twisted strings of animal gut are drawn under tension through a bath of treating liquid which gives the desired properties to the gut. While in the bath, the tension of the string is varied, particularly by cyclically applying tension and completely removing tension. This alternately stretches the gut to express liquid from it and relaxes the gut to permit it to absorb liquid again thus more rapidly circulating the liquid within the string and increasing the effectiveness of its treatment.

---

This invention relates to the making and treating of strings. Some aspects of the invention are particularly suited to making strings from animal gut, especially strings for surgical sutures. The invention is particularly related to continuous processes for forming short strips of animal gut into unlimited continuous lengths and to preparing and treating such continuous lengths to provide desired physical and chemical properties.

In the manufacture of sutures from animal gut it has long been the practice to treat the gut by various solutions for the purpose of imparting desired physical and chemical properties to the gut. Well known examples are hardening or tanning, for example with formaldehyde, chromicizing by treatment with well known chemical solutions, as well as plain wetting with water during various steps of the manufacturing process.

In our U.S. Patent Ser. No. 3,247,660, filed Sept. 9, 1964, the disclosure of which is incorporated herein by reference, we have proposed to spin, or twist, ribbons of animal gut into continuous round strings, suitable for surgical sutures, by a wet spinning operation. Spinning inherently requires winding the spun string into a package, usually on a drum, spool, stem or similar support. This produces tension in the string.

The process and apparatus disclosed in that application produce satisfactory strings, but the process and apparatus have some inherent limitations. One of these inherent limitations is that the necessary tension of winding on the drum tends to express liquid from the gut, which is undesirable at this stage in this process. Another is that rotation of the drum of the size required for practical spinning at the speed required, tends to throw off liquid by centrifugal force, and even prevents the liquid from entering between strands or turns of string on the spool. This reduces the liquid content of the gut to undesirably low levels. Still another limitation is that the tension of winding on the drum during spinning tends to distort or flatten the very soft string. This is undesirable in making a suture which requires an extremely accurate, round string.

This invention seeks to improve the process and apparatus of that application and to produce an improved string by removing the limitations discussed above, or markedly reducing their effects.

This invention is based in part on our discoveries that a superior string is produced, that the effectiveness of chemical treatment is increased, and that the treating time is shortened by allowing the spun string to relax, that is to be without tension in the direction of its length, while in a treating bath. This is especially true where the string is alternately or periodically stressed and relaxed while it is exposed to the treating liquid. Our invention is also based in part on our discovery of a method of alternate stressing and relaxing of the gut and of apparatus for performing this function, which are particularly adapted to the continuous processing of the gut in indefinite lengths.

One of the objects of the invention is to improve the quality of chemically treated strings made from animal gut by relaxing the gut either while wet, or while exposed to a chemical treating solution.

Another object of the invention is to shorten the time of chemical treatment of the gut and to improve the chemical and physical properties of the resulting suture by alternately stressing and relaxing the string while being treated chemically to alter its properties, especially by stressing and relaxing successive increments of string in a continuous process.

Another object of the invention is to provide an improved process and apparatus by which gut strings being manufactured in a continuous process and in indefinite lengths can be alternately stressed and relaxed in the process of manufacture.

Other objects and advantages of the invention will be evident from the following description and from the accompanying drawings in which:

FIG. 8 is a flow diagram of one series of steps by which the invention may be formed.

FIG. 9 is a diagrammatic vertical section of one form of apparatus used in connection with the joining and widening step of the process shown in FIG. 8.

FIG. 10 is a diagrammatic vertical section of one form of apparatus for performing the spinning step indicated in FIG. 8.

Figure 1:
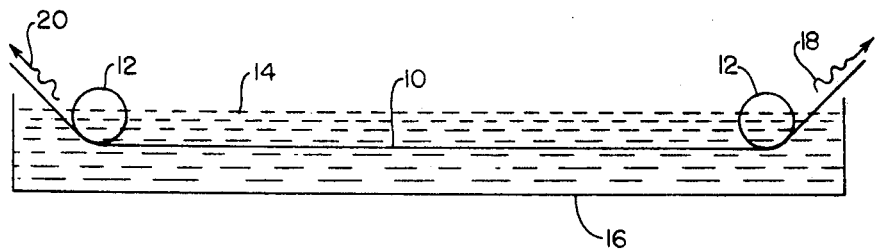
FIG. 1 is a diagrammatic elevation of a portion of our improved apparatus showing one step in the process of treating a string.

While the method and apparatus disclosed herein are especially adapted to the manufacture of surgical sutures in continuous lengths from short strips of animal gut, certain aspects of the invention are useful in the manufacture and treatment of twisted strings generally. The process and apparatus will be described, for illustration only, as applied to the manufacture of strings for surgical sutures from strips of animal gut.

We first join short strips of animal gut together, end-to-end into a continuous ribbon and then twist one or more of such ribbons into a string of indefinite length. This may be done by any known process, for example as shown in our U.S. patent application referred to. Referring to FIG. 9 we join a series of strips of animal gut end to end to form a continuous strip 116. We prefer to join the strips by knots 121 which can be applied by hand or in any suitable known way. The strips may be passed over a level winder 128 and wound on a reel 122 supported on a shaft 126 (driven by any suitable motor M) in any suitable liquid, such as water, in any suitable tank 124.

Referring to FIG. 8, the continuous strip 116 may be drawn through a first chemical treating bath A which may perform any known chemical treatment for producing gut having desired physical and chemical characteristics. One example is to chromicize or tan the gut to provide the desired rate of absorption by human tissues. The gut, whether a single strip or a number of parallel strips, and whether before or after chemical treatment, is spun into a string, after which the spun or twisted string may be given a chemical treatment, for example chemical treatment B, which may be a known formaldehyde bath. After this the string is wound on drying racks.

Our invention is applicable to any of the known chemical processes for treating and preparing animal gut to make sutures. While the first chemical treatment A such as chromicizing and a second chemical treatment B such as tanning by formaldehyde are given as examples it is possible to carry out our invention by using only one chemical treatment, after spinning, as indicated by the broken line around the chemical step A in the flow diagram of FIG. 8.

The reel 122 is removed from the water after the desired length of gut is wound on it, and may be either transferred immediately to the next step of the process or may be stored in an atmosphere of the necessary temperature or humidity for a substantial period of time, for example twenty-four hours.

The reel may be of novel construction having novel floating characteristics making it especially suitable for this process as more fully disclosed in our Patent 3,247,660.

After being wound on the spool 122 a single strand of wet gut 116 is twisted into a single ply string 10 or a plurality of strands of wet gut 116 are twisted into a multi-ply string 10, for example by the apparatus shown in FIG. 10. One or more strands or ribbons 116, on spools 122 may be floated in one or more tanks 84 containing water for floating the spools and preserving the water content of the gut. One or more strands 116 may be passed over a guide 86 and fed between positively driven feed rollers 88 to the spinning device 64. This may be of conventional form, but we prefer to use a flyer including an inverted cup 66 rotated in suitable bearings not shown, by any suitable motor, not shown, and carrying within it a flyer tube including a central entering tube 68 and symmetrically disposed flyer tubes 69 and 70. Each flyer tube terminates in a trailing portion 72 which delivers the twisted string tangentially to a spool or drum 22. The spool 22 may be continuously sprayed, by water or treating liquid, from a spray head 90. Only one flyer tube 69 or 70 is used; two are provided to facilitate threading and to achieve balance. The spool 22 is mounted on a shaft 78 which is freely rotatable in bearings not shown against the resistance of any suitable eddy current or drag brake 80. The brake, shaft, and spool are cyclically moved vertically, as is known, by any suitable means not shown.

Figure 2:
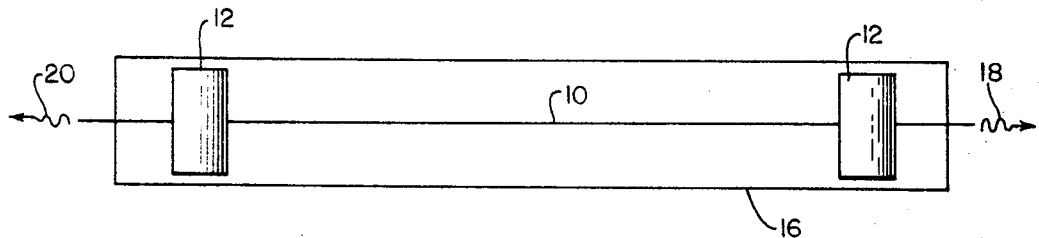
FIG. 2 is a diagrammatic plan view of the apparatus shown in FIG. 1.
Figure 3:
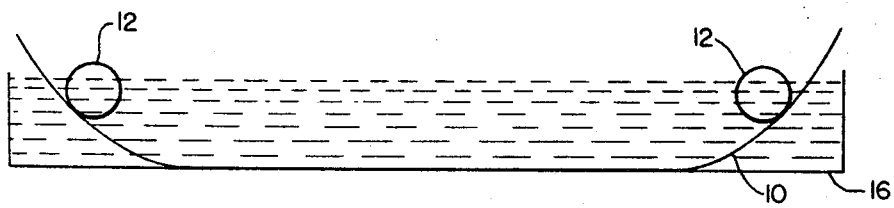
FIG. 3 is a diagrammatic elevation corresponding to FIG. 1 showing another step in the treatment process.

The twisted string 10 on the spool 22 is then treated as shown in FIGS. 1–7. We pull such a string 10 in FIG. 1 through a bath of treating liquid, which for example may be water, formaldehyde, or chromicizing solution by passing it under a pair of submerged guide rollers or bars 12 below the liquid level 14 in a suitable container such as tank 16. The string is pulled intermittently through the bath so that each successive increment of the string between the rollers 12 is alternately stressed and allowed to lie slack without any tension. This is done by applying intermittently a varying force on one end represented diagrammatically by the sinuous arrow 18, which force is resisted by an equal and opposite reaction force on the other end represented by the sinuous arrow 20. The forces may vary between two finite values but preferably between a finite value and zero and the applications of force are separated by a substantial dwell interval. The force 20 is preferably a reaction force and exists only when there is some value of force at 18. In practice, in treating continuous strings the value of the force 20 is always substantially equal to the value of the force 18, the force 18 being in excess of the force 20 merely by a small amount necessary to overcome friction and draw the string continuously through the path by a series of intermittent steps from left to right as FIG. 1 is seen. Under these conditions the string 10 between the rollers 12 has tension applied to it which tension is varied periodically or cyclically. Under this tension successive increments of the string are drawn substantially taut as shown by the elevation in FIG. 1 and travel in a straight line from one roller 12 to the other as shown in FIG. 2. During this period the string has no distorting supports between the rollers 12 and is free, under the influence of the applied tension to resume its round shape given it in the spinning operation. When there is no tension applied the increment of string between the guides 12 can fall to the bottom of the tank as shown in FIG. 3 under which conditions the string will relax and lie loosely on the bottom. It may even assume a wavey line as shown in exaggerated form in FIG. 4.

The maximum value of the tension applied to the string is sufficient to express liquid from the string when the tension causes pressure between adjacent fibers or layers by tending to twist the string tighter. When the string is relaxed the material of the string is loose and it will tend to absorb again liquid which has been expressed from it. This alternate absorption and expression of liquid circulates the liquid in the material of the string and so both hastens and renders more uniform the treatment which the liquid bath provides. If the liquid bath is a hardening solution the alternate stressed and slack periods permit the string to resume its normal round shape and this shape is preserved during subsequent tension and drawing of the string over the guides 12.

Also when the string drops to the bottom of the tank as indicated in FIG. 3 and moves back again to the position indicated in FIG. 1 when tension is subsequently applied, this motion of the string provides a gentle agitation of the liquid and tends to prevent the liquid from forming a layer or cylinder of exhausted liquid surrounding the string.

We refer to the liquid as being one which gives desired physical and/or chemical properties to the string. For example if a string of gut has previously been exposed to a chemical tanning solution, the liquid in the tank 16 may be a plain water rinse to remove excess tanning solution from the string. The plain water rinse gives desired properties to the string by stopping the action of the tanning solution at the desired point.

The liquid in the tank 16 may be any desired substance to provide any desired property in the string. In any case the alternate tension and relaxing of the string speeds up the process of treatment and renders its result more uniform, and the periods of zero tension assist in allowing the string to resume its normal round form.

Figure 5:
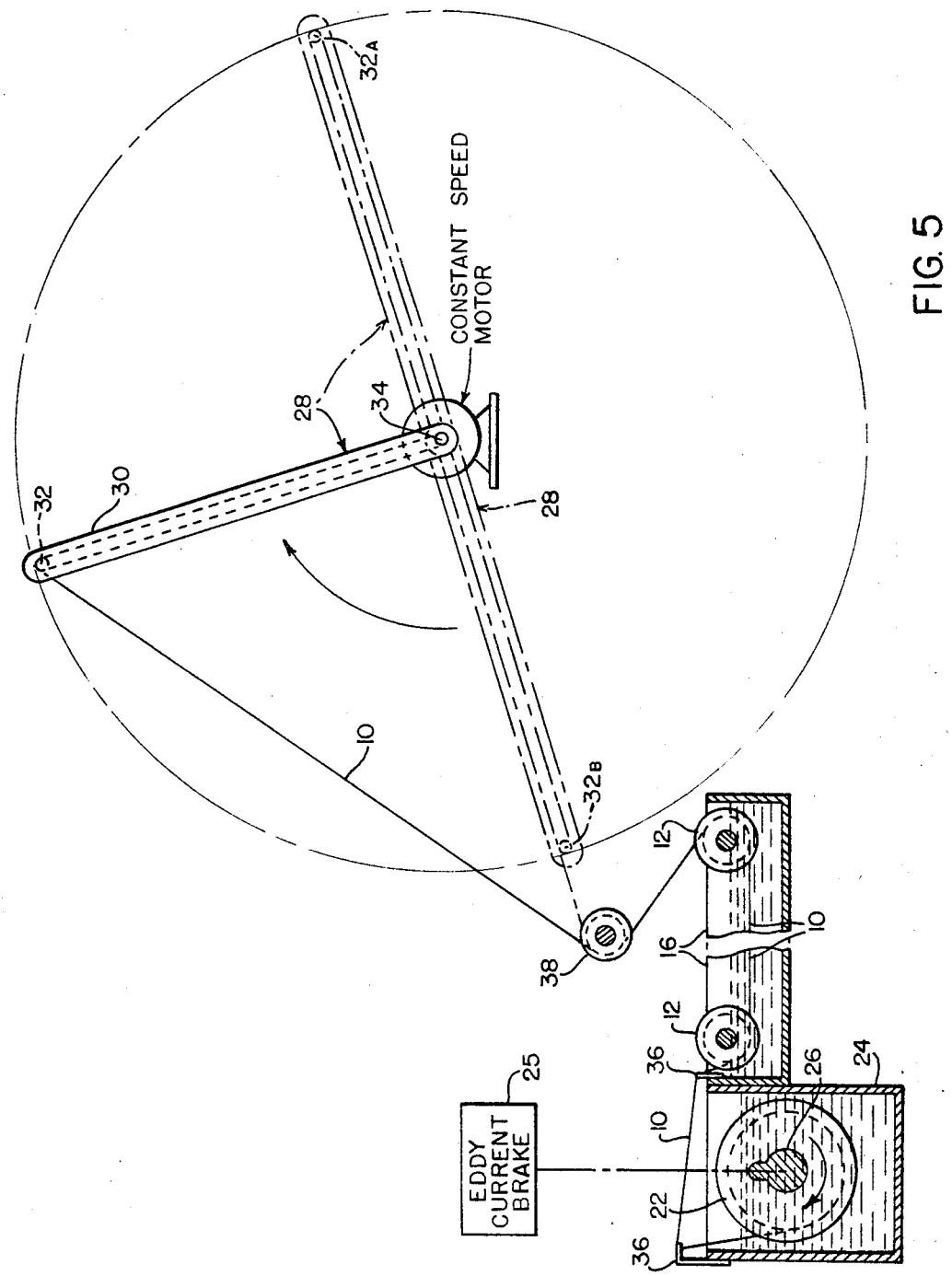
FIG. 5 is a diagrammatic illustration of one form of apparatus embodying our invention.

FIG. 5 is a diagrammatic illustration of one form of apparatus for performing the method of treatment above described. The string 10, spun as described and wound into a package on a spool 22 which may be immersed in any suitable liquid in a tank 24, and is rotatably supported therein on any suitable support such as a rotatable shaft 26 to which the spool 22 is keyed. A drag brake 25 is connected to resist rotation of the shaft as will be explained.

A flat rectangular take-off rack 28 preferably includes two side bars 30 held apart by two end bars 32 and 34 which end bars form lines of support for the string to be wound on the rack all as more fully disclosed in our application referred to. The rack is mounted on any suitable pivot supports, not shown, the axis of which may coincide with the axis of end bar 34. The rack is rotated at substantially constant speed about this axis by any suitable constant speed motor.

In practice the string is secured to one of the line support bars 32 or 34 after being led from the spool 22 over suitable guides 36 under the rollers 12 and over a guide 38 which may be a known level winder for distributing the string in evenly spaced turns along the lengths of the supports 32 and 34.

Referring to FIG. 5, when the rack 28 is rotating clockwise and in the position shown in full lines the string is being pulled at its fastest rate away from the guide 38 and consequently the spool 22 is being rotated to unwind the string at its fastest rate. After the arm 30 passes the position shown in FIG. 5, which is perpendicular to a line through the pivot axis at bar 34 and tangent to the guide 38, the rate of unwinding the spool decreases until the arm 32 reaches the dotted line position 32A. At this point movement of the string away from the guide 38 has stopped and such movement does not again resume until the arm 30 has rotated 180 degrees farther and the support 32 has reached the position 32B. Upon further rotation past 32B, the support 32 again picks up the string and pulls it from the spool 22 for another half revolution of the arm 30. Consequently as the rack revolves at a constant angular speed the string is stopped for one half of the revolution of the rack and is pulled off from the spool and through the bath at a varying linear speed, through the other half revolution. This linear speed varies from zero (when the arm 32 is at the point 32B) to a maximum when the arm 30 is in the position shown in full lines in FIG. 5, and dropping again to zero when the arm 32 reaches the position 32A.

The drag brake is arranged to apply an opposite force to the left end of the string substantially equal to that applied to the right end of the string by the pull of the support bar 32, plus the friction of the guides. When there is no pull on the string by the support bar 32, for example when the bar 32 is between the positions 32A and 32B, rotating clockwise, then the drag brake applies no tension to the string. That is, there is no opposing or reaction force, and during one-half of a revolution the string lies slack in the bath.

We prefer to oppose unwinding of the string by a force on the spool which varies with the speed of rotation of the spool, for example by means of an eddy current brake of any known form. This type of brake depends for its resistance upon motion of the spool. When the spool is not moving there is no resistance to its rotation offered by the brake. If the spool rotates slowly there is a small resistance force offered to rotation. As the speed of rotation increases, the force opposing rotation of the brake increases, and can rise to a maximum value for that brake which may be a constant value for all practical purposes. With this type of brake as the arm 30 begins to sweep the support 32 away from the point 32B the speed of unwinding string from the drum will be very slow and the drum will rotate very slowly so that the resistance offered by the eddy current drag brake will be low. While there will be some tension in the string the value of this tension will be low. As the arm sweeps for example past the full line position of FIG. 5 the string is being unwound most rapidly from the drum, and the drum is rotated rapidly so that a higher value of resistance is offered and this may reach the maximum constant value of which the brake is capable. During this period the string is under relatively high tension. As the support 32 reaches position 32A, the speed of unwinding again drops to zero, the resistance offered by the eddy brake again drops to zero and there is no tension in the string. When the tension of the string is thus very low or zero the string is free to drop to the bottom of the tank as indicated in FIGS. 3 and 4.

Figure 4:
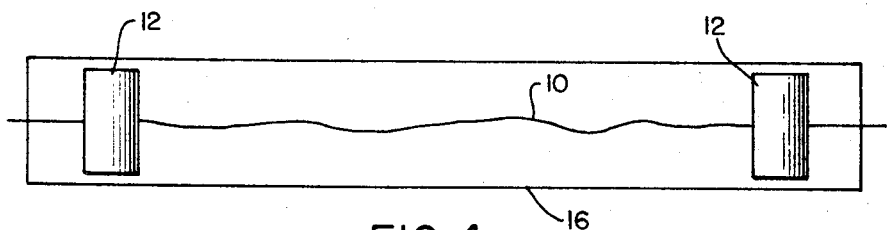
FIG. 4 is a diagrammatic plan view corresponding to FIG. 2 showing the step in the process which is depicted in FIG. 3.

In the periods of time when the tension is high the liquid contained or entrained in the string is expressed from the string and during the periods when the string is slack as in FIGS. 3 and 4 the material of the string can relax and absorb liquid into the string again. This alternate absorption and expression of liquid from the string carries out the process described above and in connection with FIGS. 1 to 4.

Figure 6:
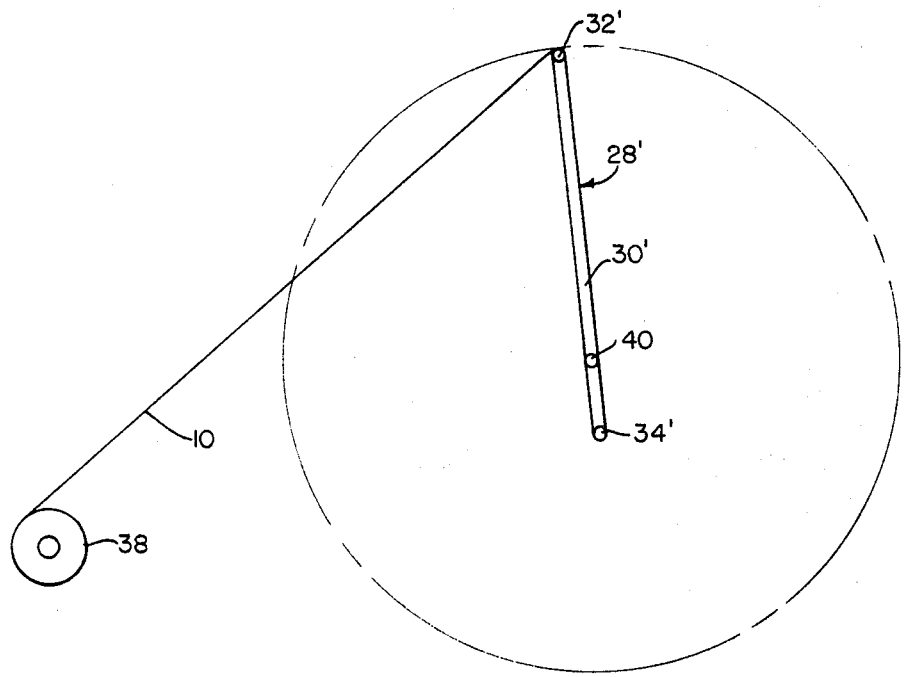
FIG. 6 is a diagram corresponding to FIG. 5 of a portion of a modified form of the apparatus.

Instead of having the support bar 34 located at the center of rotation of the rack we may place it at some distance away from the center, on the opposite side of the center from the bar 32. This arrangement is shown in FIG. 6 wherein the rack 28' has bars 30' carrying line supports 32' and 34' and is pivoted at 40.

Figure 7:
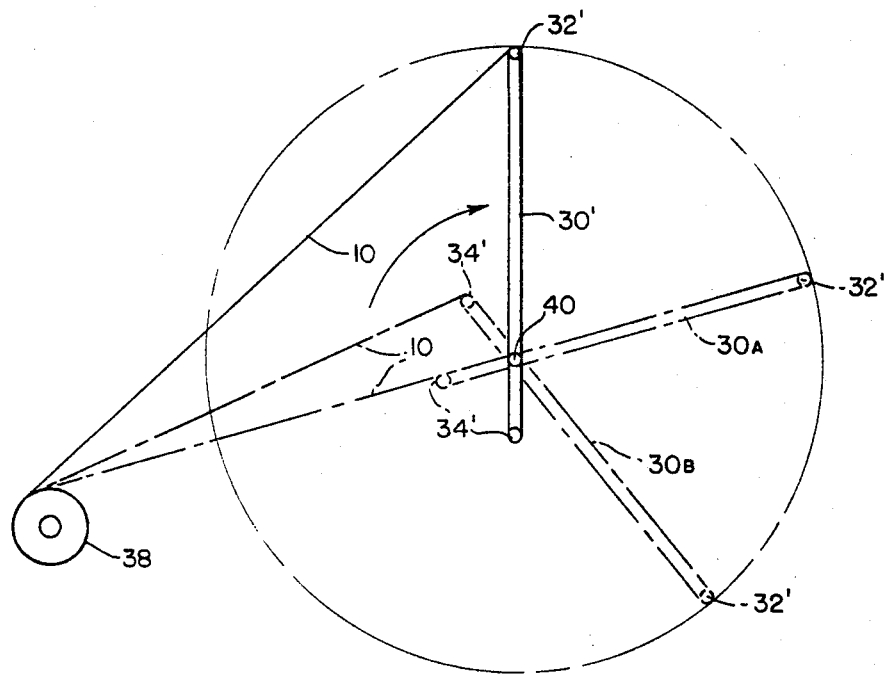
FIG. 7 is a diagram of the apparatus shown in FIG. 6 showing various moments or steps in the winding of the string on the apparatus.

Referring to FIG. 7 when the arm 30' is in the full line position, and rotating clockwise, the support 32' is moving the spring very rapidly off from the spool. When the bar 30' reaches the position 30'A (so that the supports 32' and 34' are in a line tangent to the spool 38) there is no movement of the string. Further rotation of the rack clockwise, for example to position 30B causes the support 34' to pick up the string and unwind it from the spool. Because the arm to the support 34' is shorter than the arm to the support 32', the linear speed of unwinding the string is now less than the speed produced by the bar 32'. Thus in one half of each revolution the string is unwound rapidly from the spool and in the other half of each revolution the string is unwound slowly from the spool, with speed varying from zero to some maximum and back to zero. This maximum produced by the support 34' is much less than the maximum produced by the support 32'. This arrangement applies to the string a force or tension varying between two finite values with a brief interval of zero between the stressed periods.

If the distance of the arm or support 34' from the center of rotation is equal to the distance of the arm 32' there will be two periods of tension which are relatively long, interspersed by two very short periods of zero tension. The maximum tension in each half of the revolution will be the same instead of being different as described above. The maximum tension occurs when the arm 30 is at right angles to the line from the center of rotation 40 to the guide 38 and the zero tension occurs when the supports 32' and 34' are in a line tangent to the guide 38.

We claim as our invention:

1. In a method of preparing sutures from animal gut the improvement which includes twisting a plurality of flat ribbons of wet animal gut into a string, winding the string into a rotatable package, supporting the package for rotation, resisting rotation of the package, rotating the package by pulling the string tangentially therefrom, moving the string in the direction of its length under a guide submerged in a liquid exposure to which gives the gut desired properties, winding the string on a supporting means rotating at substantially constant speed and having a line support substantially at the axis of rotation of the supporting means and a second line support revolving about said axis at a distance therefrom whereby the string will have a cyclically varying tension from zero to a finite value while in the liquid to alternately express liquid from the material of the string and absorb liquid into the material of the string and move cyclically and vertically through the liquid to agitate the liquid while the string is moving through the liquid.

2. In a method of preparing sutures from animal gut the improvement which includes twisting a plurality of flat ribbons of wet animal gut into a string, winding the string into a rotatable package; supporting the package for rotation, resisting rotation of the package, rotating the package by pulling the string tangentially therefrom, moving the string in the direction of its length under a guide submerged in a liquid exposure to which gives the gut desired properties, winding the string on a supporting means rotating at substantially constant speed and having line supports spaced at varying distances from the axis of rotation of the supporting means whereby the string will have a cyclically varying tension applied to it while in the liquid to alternately express liquid from the material of the string and absorb liquid into the material of the string while the string is moving through the liquid.

3. In a method of preparing sutures from animal gut the improvement which includes twisting a plurality of flat ribbons of wet animal gut into a string, winding the string into a rotatable package; supporting the package for rotation, resisting rotation of the package, rotating the package by pulling the string tangentially therefrom, moving the string in the direction of its length under a guide submerged in a liquid exposure to which gives the gut desired properties, winding the string on a supporting means rotating at substantially constant speed and having not more than two circumferentially spaced line supports for the string, whereby the string will have a cyclically varying tension applied to it while in the liquid to alternately express liquid from the material of the string and absorb liquid into the material of the string while the string is moving through the liquid.

4. In a method of preparing sutures from animal gut the improvement which includes twisting a plurality of flat ribbons of wet animal gut into a string, winding the string into a rotatable package; supporting the package for rotation, resisting rotation of the package by a force which varies directly with the speed of rotation of the package rotating the package by pulling the string tangentially therefrom, moving the string in the direction of its length under a guide submerged in a liquid exposure to which gives the gut desired properties, winding the string on a supporting means rotating at substantially constant speed and having not more than two support lines for the string spaced angularly about the axis of rotation of the supporting means whereby the string will move periodically and vertically through the liquid to agitate the liquid while the string is moving through the liquid.

5. In a method of preparing sutures from animal gut the improvement which includes twisting a plurality of flat ribbons of wet animal gut into a string, winding the string into a rotatable package; supporting the package for rotation, resisting rotation of the package by a force, rotating the package by pulling the string tangentially therefrom, moving the string in the direction of its length under a guide submerged in a liquid exposure to which gives the gut desired properties, winding the string on a supporting means rotating at substantially constant speed and having not more than two support lines for the string spaced angularly about the axis of rotation of the supporting means whereby the string will have a periodically varying tension applied to it while in the liquid to alternately express liquid from the material of the string and absorb liquid into the material of the string while the string is moving through the liquid.

6. In a method of preparing sutures from animal gut the improvement which includes twisting a single flat ribbon of wet animal gut into a string, winding the string into a rotatable package; supporting the package for rotation, resisting rotation of the package by a force, rotating the package by pulling the string tangentially therefrom, moving the string in the direction of its length under a guide submerged in a liquid exposure to which gives the gut desired properties, winding the string on a supporting means rotating at substantially constant speed and having not more than two support lines for the string spaced angularly about the axis of rotation of the supporting means whereby the string will have a periodically varying tension applied to it while in the liquid to alternately express liquid from the material of the string and absorb liquid into the material of the string while the string is moving through the liquid.

7. In a method of preparing sutures from ribbons of animal gut the improvement which includes twisting one or more flat ribbons of wet animal gut into a string, immersing the string in a liquid exposure to which gives the gut desired properties, and while the string is immersed circulating the liquid through the string by both stressing the string in the direction of its length and periodically varying the stress from zero to a value sufficient to express liquid from the string.

8. In a method of preparing sutures from ribbons of animal gut the improvement which includes twisting one or more flat ribbons of wet animal gut into a string, immersing the string in a liquid, and while the string is immersed circulating the liquid through the string by both stressing the string in the direction of its length and periodically varying the stress.

9. In a method of preparing sutures from ribbons of animal gut the improvement which includes twisting one or more flat ribbons of wet animal gut into a string, immersing the string in a liquid exposure to which gives the gut desired properties, and while the string is immersed stressing the string in the direction of its length and periodically varying the stress.

10. In a method of preparing sutures from ribbons of animal gut the improvement which includes twisting one or more flat ribbons of wet animal gut into a string, immersing the string in a liquid and while the string is immersed stressing the string in the direction of its length and periodically varying the stress from zero to a value sufficient to express liquid from the string.

11. In a method of preparing sutures from ribbons of animal gut the improvement which includes twisting one or more flat ribbons of wet animal gut into a string, immersing the string in a liquid, and while the string is immersed stressing the string in the direction of its length and periodically varying the stress.

12. In a method of preparing sutures from ribbons of animal gut the improvement which includes wetting a twisted string of animal gut in a liquid, and while the string is wet alternately stretching and relaxing the string.

13. Apparatus for treating strings comprising in combination a first rotatable support for a package of twisted string, a tank for treating liquid; second support means for guiding the string under the liquid in the tank; means for unwinding the string from the package and pulling it through the treating liquid including a third and rotatable supporting means providing a pair of lines of support for the string, at least one of which lines of support can revolve about the axis of rotation of the third support means, and means for rotating the third support means at a substantially constant rotary speed to wind the string thereon; and means for resisting rotation of the first support with a force which varies with the speed of rotation of the first support whereby a periodically varying tension is imposed on the string in the tank.

14. Apparatus for treating strings comprising in combination a first rotatable support for a package of twisted string, a tank for treating liquid; second support means for guiding the string under the liquid in the tank; means for unwinding the string from the package and pulling it through the treating liquid including a third and rotatable supporting means providing a pair of lines of support for the string, at least one of which lines of support can revolve about the axis of rotation of the third support means, and means for rotating the third support means to wind the string thereon; and means for resisting rotation of the first support with a force which varies with the speed of rotation of the first support, whereby a periodically varying tension is imposed on the string in the tank.

15. Apparatus for treating strings comprising in combination a first rotatable support for a package of twisted string, a tank for treating liquid; second support means for guiding the string under the liquid in the tank; means for unwinding the string from the package and pulling it through the treating liquid including a third and rotatable supporting means providing a line of support for the string at one radial distance from the axis of rotation of the third rotatable support and a second line of support for the string closer to the axis of rotation than the first line of support, means for rotating the third support to wind the string thereon, and means for resisting rotation of the first support whereby a periodically varying tension is imposed on the string.

16. Apparatus for making sutures comprising in combination a rotatable support for a package of twisted string of animal gut, a tank for liquid, means for pulling the string at cyclically varying linear speed through the tank, guide means for holding the string submerged, and means for resisting rotation of the support whereby the variation in speed produces variation in tension of the submerged string.

17. Apparatus for making sutures comprising in combination a rotatable support for a package of twisted string of animal gut, a tank for liquid, means for pulling the string substantially horizontally through the tank, guide means for holding the string submerged, means for resisting rotation of the support, and means for cyclically moving the string vertically in the tank by cyclically varying the tension exerted by the pulling means.

18. Apparatus for treating strings comprising in combination a first rotatable support for a package of twisted string, means for resisting rotation of the package, a tank for treating liquid; second support means for guiding the string under the liquid in the tank; means for unwinding the string from the package and pulling it through the treating liquid including a third and rotatable supporting means providing a first line of support for the string which during a part of each rotation of the supporting means pulls the string against the resisting means and a second line of support for the string which during another part of each rotation does not pull the string against the resisting means.

19. Apparatus for treating strings comprising in combination a first rotatable support for a package of twisted string, means for resisting rotation of the package, a tank for treating liquid; second support means for guiding the string under the liquid in the tank; means for unwinding the string from the package and pulling it through the treating liquid including a third and rotatable supporting means providing a first line of support for the string which during a part of each rotation of the supporting means pulls the string relatively rapidly against the resisting means and a second line of support for the string which during another part of each rotation pulls the string relatively slowly against the resisting means.

20. In a method of preparing a twisted string of indefinite length the improvement which includes immersing a twisted string in a liquid exposure to which gives the string desired properties, and while the string is being immersed stressing the string in the direction of its length and periodically varying the stress.

21. In a method of preparing twisted string the improvement which includes drawing a twisted string of indefinite length substantially continuously in the direction of its length while wetting the string with a liquid the exposure to which gives the string the desired properties and while the string is wet stressing the string in the direction of its length and periodically varying the stress.

22. In a method of preparing twisted round strings of indefinite length from short ribbons of animal gut the improvement which includes spinning ribbons of gut while wet into a string and winding the string while wet onto a package under tension, unwinding the string from the package while drawing the string progresively through a liquid treatment bath and at times while the string is in the bath removing from the string substantially all stress in the direction of its length.

References Cited
UNITED STATES PATENTS

| | | | |
|---|---|---|---|
| 1,647,303 | 11/1927 | Moore | 57—35 |
| 2,173,997 | 9/1939 | Burgeni | 28—59.5 X |
| 2,320,691 | 6/1943 | Wright | 57—164 X |
| 3,026,167 | 3/1962 | Hoffmann et al. | 28—59.5 X |
| 3,247,660 | 4/1966 | Reeder et al. | 57—35 |

FRANK J. COHEN, *Primary Examiner.*

W. H. SCHROEDER, *Assistant Examiner.*